Figure 1:
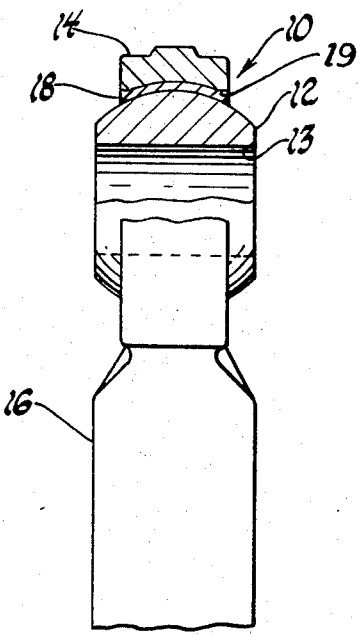

United States Patent

[11] 3,593,399

| | | | |
|---|---|---|---|
| [72] | Inventor | George I. Bannister<br>Orange, Calif. | |
| [21] | Appl. No. | 884,297 | |
| [22] | Filed | Dec. 11, 1969 | |
| [45] | Patented | July 20, 1971 | |
| [73] | Assignee | Lear Siegler, Inc.<br>Santa Monica, Calif. | |

[54] METHOD OF MAKING A ROD END BEARING
3 Claims, 4 Drawing Figs.

[52] U.S. Cl. ..................................................... 29/149.5 B,
29/441
[51] Int. Cl. ..................................................... B23p 11/00
[50] Field of Search............................................ 308/72;
29/149.5, 149.5 B, 441, 149.5 NM

[56] References Cited
UNITED STATES PATENTS
3,303,557  2/1967  Litsky.......................... 29/149.5 B

*Primary Examiner*—Thomas H. Eager
*Attorney*—Barnard, McGlynn & Reising

ABSTRACT: A method for making spherical rod end bearings comprising pressing a right cylindrical bushing into a radially uniform semispherical clearance between a ball and a bearing retainer or banjo. A single or double bushing may be used. A new bushing may be used to eject an old one. The retainer is preferably provided with axially oriented annular flats adjacent the opposite ends thereof to lock the bushing into place.

3,593,399

INVENTOR.
George I. Bannister
BY
Bernard, McGlynn & Reising
ATTORNEYS

METHOD OF MAKING A ROD END BEARING

This invention relates to spherical bearings of the type commonly called rod end bearings and more particularly to an improved manufacturing method for such bearings.

Heretofore, rod end bearings have generally been manufactured according to one of two assembly methods. The first method involves placing a right cylindrical bushing between a spherical ball and a bearing retainer having a right circular inner surface and swaging the retainer and bushing into a semispherical shape thereby to conform with the ball. The second method involves premachining a pair of bushings to exhibit cylindrical outer surfaces but semispherical inner surfaces and then pressing the two bushings from opposite sides into the inwardly narrowing clearance between a ball and a bearing retainer to essentially deform only the outer surface of the bushings in the process.

According to the present invention, a spherical or rod end bearing is assembled by pressing a simple right cylindrical bushing into a radially uniform clearance between a ball and a semispherical retainer member, deforming the bushing but retaining a substantially uniform thickness therein. With respect to the first prior art method outlined above the subject invention eliminates the swaging of the retainer member, facilitates the repeatability of the assembly process thereby to realize uniform performance specifications from one bearing to the next, and permits the bearing to be reconstructed simply by driving the old bushing out and pressing a new bushing into its place. With respect to the second prior art method outlined above, the present invention eliminates the expensive step of machining the bushings to a semicylindrical inner surface configuration prior to assembly, permits the use of a simple right cylindrical bushing which may be either unitary or split, and, again, permits reconstruction of the assembly by driving out the old bushing and pressing in a new bushing, this preferably being accomplished in a single press stroke.

Figure 2:
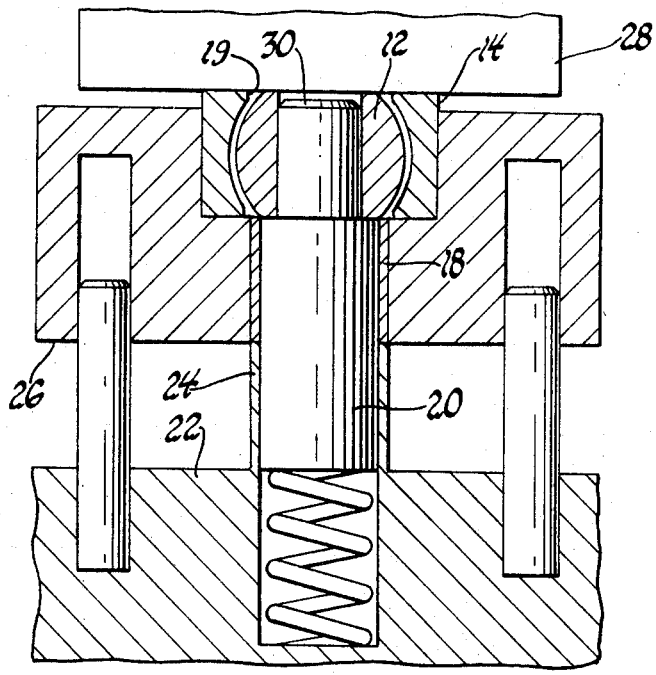
Figure 3:
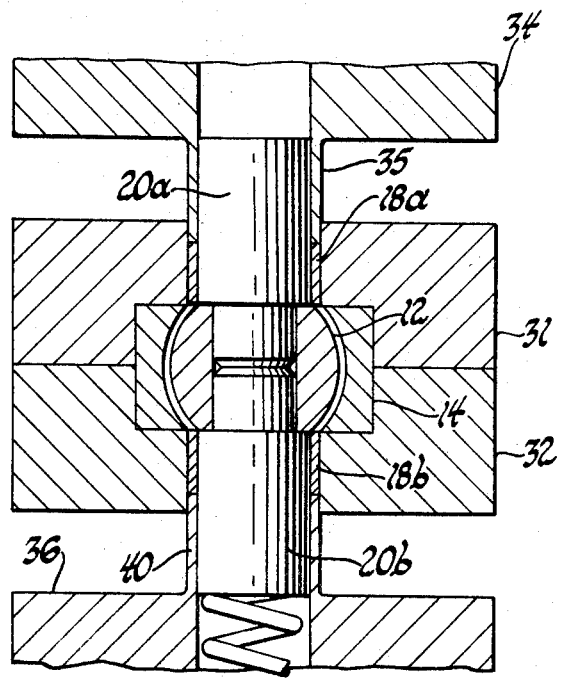
Figure 4:
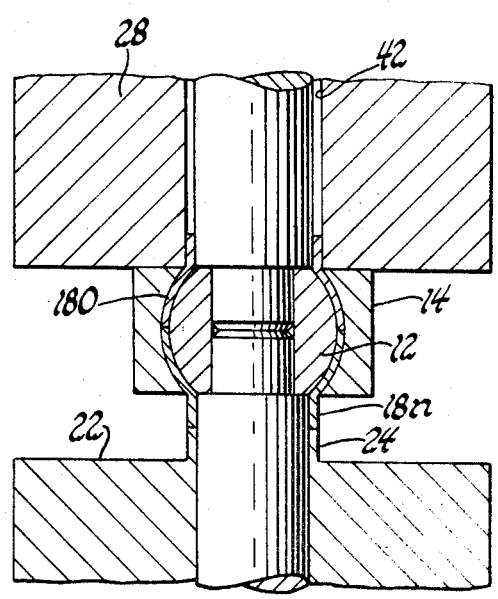

The various features and advantages of the subject invention will become more apparent upon reading the following specification which describes specific applications of the invention. This specification is to be taken with the accompanying drawing of which:

FIG. 1 is a side view partly in cross section of a spherical bearing assembled in accordance with the invention, Fig. 2 is a schematic diagram of the apparatus involved in carrying out a first method embodying the invention, FIG. 3 is a schematic diagram of apparatus used in carrying out a second embodiment of the invention, and, FIG. 4 is a schematic diagram of apparatus used in carrying out a third embodiment of the invention this embodiment being a modification of the embodiment of Figure 2.

Referring to FIGURE 1, a spherical bearing 10 commonly called a rod and bearing is shown to comprise a bearing ball 12 having a semispherical annular exterior surface and an axial bore 13. Ball 12 is disposed within a bearing retainer member 14, commonly called a "banjo," having a semispherical internal surface. This surface defines a clearance which receives and is filled by a semispherical annular bushing 18 having a uniform radial thickness when in place between the ball 12 and the bearing retainer 14. Bearing retainer member 14 has a shank or shaft portion 16 as will be well known to those skilled in the art. The bushing 18 as is also well known to those skilled in the art, may be a malleable metal such as bronze having lubricating holes or grooves or lined with a lubricant impregnated fabric material of a type commonly and commercially available. The retainer 14 is preferably machined such that the inner surface has axially opposite annular flats 19 to which the bushing 18 conforms. These flats 19 tend to lock bushing 18 into place.

Referring to FIGURE 2 the ball 12 and bearing retainer member 14 are shown disposed in their normally operative position prior to the insertion of the bushing 18. Bushing 18, prior to insertion, is of right cylindrical configuration having a uniform radial thickness throughout. Ball 12 is placed on top of an incompressible plug 20 which in turn fits on a press bed 22 having an annular upstanding portion 24 which supports the bushing 18 in alignment with the clearance between the ball 12 and the surrounding retainer member 14. A suitable support member 26 is disposed about the outer surface of the bushing 18 as well as the bearing retainer member 14 maintain those elements in the proper position prior to the downward stroke of a ram 28 which engages the upper horizontal surfaces of the ball 12 and the retainer member 14.

In operation, the apparatus of FIGURE 2 is suitably activated such that the ram 28 moves downwardly toward the bed 22 pressing the bushing 18 into the uniform clearance between the outer surface of ball 12 and the inner surface of retainer member 14, deforming the bushing 18 into a semispherical configuration in the process. Plug 20 prevents the internal diameter of the bushing 18 from changing during the ram stroke. The support member 26 prevent the outer diameter of the bushing 18 from changing during the ram stroke. A plug 30 may be placed within the bore of ball 12 to prevent changes in the inner diameter thereof.

Referring to FIGURE 3, an apparatus as shown for pressing into position a split bushing comprising identical portions 18A and 18B. Identical reference characters are used as between FIGURES 2 and 3 wherein identical parts are involved. The ball 12 is disposed between axially aligned plugs 20A and 20B which in turn are disposed concentrically and snugly within the bushing portions 18A and 18B, respectively. Bearing retainer member 14 is maintained in position about the ball 12 by means of suitable support members 31 and 32. Bushing portion 18A is engaged and driven by the annular collar portion 35 of a ram 34. Bushing portion 18B is supported by annular upstanding portion 40 of a bed 36. Again the bore of ball 12 may be plugged to prevent deformation. Although not illustrated, the retainer 14 of FIG. 3 may also be provided with the locking flats 19 of FIG. 1.

In the assembly process depicted in FIG. 3, the ram 34 is moved downwardly toward the bed 36 such that the depending annular portion 35 drives the bushing 18A into the upper half of the clearance between the ball 12 and the bearing retainer 14 while the upstanding annular portion of the bed 36 drives the bushing 18B into the lower half of the clearance. The bushings 18A and 18B are of the same size and, therefore, meet substantially at the center of the assembly including ball 12 and retainer member 14. The previously right cylindrical bushings 18A and 18B deform into a semispherical configuration but maintain a substantially uniform radial thickness because of the substantially uniform radial thickness of the clearance between the ball 12 and the bearing retainer 14.

Referring to FIG. 4 a modification of the apparatus and process depicted in FIG. 2 is shown. In FIG. 4 a bushing 18N is being pressed into the clearance between the spherical surface of ball 12 and the inner surface of bearing retainer 14 as a previously inserted bushing 180 is being driven out of the clearance and into an annular opening 42 in the ram 28. The plug 20 prevents the inner diameter of the new bushing 18N from changing during the ram operation. Other than the fact that the new bushing 18N drives out the old bushing 180 as it is being inserted the apparatus and method shown in FIG. 4 is otherwise identical to that shown in FIG. 2. Again, the retainer 14 of FIG. 4 may also be provided with the locking flats 19 of FIG. 1.

It is to be understood that the foregoing embodiments of the invention are illustrative in character and that various modifications therein may occur to those skilled in the art. For a definition of the invention, reference should be taken to the appended claims.

The embodiments of the invention in which I claim an exclusive property or privilege are defined as follows:

1. A method of making a rod end bearing comprising the steps of: placing a bearing ball in a semispherical retainer to define a substantially uniform semispherical annular clearance between the outer surface of the ball and the inner surface of the retainer; aligning a right cylindrical bushing of substantially uniform radial thickness with the clearance, and pressing the bushing into the clearance to deform the bushing into conformity therewith.

2. The method defined in claim 1 wherein the ball is initially held in place by a preinserted bushing, the step of pressing the bushing into the clearance causing simultaneous ejection of the preinserted bushing.

3. A method of making a rod end bearing comprising the steps of: placing a bearing ball in a semispherical retainer to define a substantially uniform semispherical annular clearance between the outer surface of the ball and the inner surface of the retainer, aligning a pair of cylindrical bushings of substantially uniform radial thickness with and on opposite sides of the clearance; and pressing the bushings into the clearance to deform the bushings into conformity therewith.